United States Patent [19]

Watanabe et al.

[11] Patent Number: 4,709,775
[45] Date of Patent: Dec. 1, 1987

[54] TORQUE CONTROL SYSTEM FOR VEHICLES

[75] Inventors: Kenichi Watanabe; Hideshi Hiruta; Manabu Hiketa, all of Hiroshima, Japan

[73] Assignee: Mazda Motor Corporation, Hiroshima, Japan

[21] Appl. No.: 901,776

[22] Filed: Aug. 29, 1986

[30] Foreign Application Priority Data

Aug. 30, 1985 [JP] Japan .................... 60-191033
Aug. 30, 1985 [JP] Japan .................... 60-191035
Sep. 20, 1985 [JP] Japan .................... 60-206271

[51] Int. Cl.$^4$ .................................. B60K 17/34
[52] U.S. Cl. .......................... 180/233; 74/866; 364/424.1
[58] Field of Search .......... 180/247, 248, 249, 250, 180/233, 297; 74/866, 877; 364/424.1

[56] References Cited

U.S. PATENT DOCUMENTS 4,466,502 8/1984 Sakai ........................... 180/247
4,576,061 3/1986 Yamakawa ............... 180/247 X

FOREIGN PATENT DOCUMENTS 56122630 5/1955 Japan .
2114252 8/1983 United Kingdom .
2146727 4/1985 United Kingdom ......... 180/247

Primary Examiner—John A. Pekar
Attorney, Agent, or Firm—Fleit, Jacobson, Cohn & Price

[57] ABSTRACT

A torque control system for vehicles provided with a four-wheel drive mechanism including a power plant having an engine and transmission, and torque control means for controlling a torque distribution between front and rear wheels detecting rotation speed difference between the front and rear wheels so that the torque distribution ratio of the rear wheels to the front wheels can be maintained at a given constant value irrespective of a change of the output torque of the power plant. The torque control system is provided with a vehicle speed sensor and steering angle sensor in order to obtain the rotation speed difference.

13 Claims, 9 Drawing Figures

TORQUE CONTROL SYSTEM FOR VEHICLES

BACKGROUND OF THE INVENTION

The present invention relates to a torque control system for vehicles, and more particularly to a torque control system for vehicles provided with a so-called four-wheel drive system wherein a drive torque transmitted to wheels is controlled in a manner that a torque distribution ratio between front wheels and rear wheels can be maintained at a given constant value.

DESCRIPTION OF THE PRIOR ART

There have already been proposed vehicles provided with a four-wheel drive system in which a drive torque is transmitted to not only two wheels of a four-wheeled vehicle but also to four wheels. For example, in Japanese Utility Model Public Disclosure No. 56-122630, there is disclosed a vehicle which comprises a power plant includes an engine and a transmission, a first drive shaft directly connected with the power plant, and a second drive shaft connected with the power plant through a driving power transmitting device such as clutches so that a switching control between two-wheel driving condition and four-wheel driving condition of the vehicle can be smoothly achieved by controlling engagement and disengagement of the driving power transmitting device.

UK Patent Application Public Disclosure No. 2114252 A, laid open to the public on Aug. 17, 1983, also disclosed a four-wheel drive system which automatically changes a two-wheel driving system to a four-wheel driving system by means of a pressure oil operated clutch for transmitting the power of the engine to auxiliary driving wheels in accordance with the slip rate of wheels.

In the four-wheel drive system, it will be noted that for example, an engaging force provided by a clutch for switching between the two-wheel driving condition and four-wheel driving condition is controlled to change the amount of the drive torque transmitted through the clutch so that the torque distribution ratio between the front wheels and rear wheels can be controlled.

However, when an output torque of the power plant changes in the case where the torque distribution ratio between the front and rear wheels is controlled by means of this system, it is necessary to change the engaging force produced by the clutch to thereby control the amount of the torque transmitted through the clutch in accordance with the change of the output torque of the power plant in order to maintain a given constant value of the torque distribution ratio between the front and rear wheels. This means that the amount of the torque transmitted through the clutch changes in relation only to the change of the engaging force produced by the clutch.

In order to control the amount of the torque transmitted through the clutch in accordance with the change of the output torque of the power plant, for example, a torque detecting device can be employed for detecting the output torque of the power plant so that the engaging force may be controlled based on a signal from the torque detecting device. It is however disadvantageous that such detecting device as aforementioned is quite expensive resulting in an increase of the cost of the torque control system.

SUMMARY OF THE INVENTION

It is therefore an object of the present invention is to provide an improved torque control system in four-drive wheel system wherein the torque distribution ratio between the front and rear wheels can be maintained at a desirable value irrespective of the change in the output torque of the power plant.

It is another object of the present invention is to provide an improved torque control system in four-drive wheel system wherein the amount of the transmitted torque through a drive torque transmitting mechanism is controlled based on a rotation speed difference between the front and rear wheels corresponding to a change of the output torque of the power plant.

It is further object of the present invention to provide an inexpensive torque control system for vehicles incorporated into a four-wheel drive vehicle.

According to the present invention, the above and other objects can be accomplished by a torque control system for vehicles provided with four-wheel drive system including a power plant producing a drive torque for driving wheels, torque transmitting mechanisms for transmitting the drive torque from the power plant to front and rear wheels respectively, and power transmitting means provided in at least one of said power transmitting mechanisms for changing the amount of the drive torque transmitted through said power transmitting means so that the torque distribution ratio between the front and rear wheels can be controlled, CHARACTERIZED IN THAT the torque control system further comprises vehicle speed detecting means for detecting a vehicle speed, steering angle detecting means for detecting a steered angle of the steering wheel, speed difference detecting means for detecting a rotation speed difference between the front and rear wheels, torque control means for controlling the amount of the torque transmitted through the power transmitting means in accordance with signals from said vehicle speed detecting means, steering angle detecting means and speed difference detecting means so that the torque distribution ratio between the front and rear wheels is maintained at a desirable constant value. The present invention relies on a principle described hereinafter.

Where the torque transmitting means is provided in the torque transmitting mechanism to the rear wheels, and where an output torque of the power plant is $T_p$ an output torque for front wheels and for rear wheels are $T_f$, $T_r$, and a desirable torque distribution rate for the rear wheels is u respectively, following relations are obtained:

$$T_p = T_f + T_r \qquad (1)$$

$$T_r = u T_p \qquad (2)$$

$$\therefore T_f = \frac{1-u}{u} T_r \qquad (3)$$

Where driving forces for the front and rear wheels are $F_f$, $F_r$, slip rate in the front and rear wheels are $S_f$, $S_r$, angular velocities of the front and rear wheels are $W_f$, $W_r$, forces applied to the ground from the front and rear wheels are $N_f$, $N_r$, dynamic effective radiuses of the front and rear wheels are $R_f$, $R_r$, a coefficient is M, and a constant determined based on a slip property inherent in tires of the wheels is k which is shown in FIG. 9, following formulas are obtained:

$$F_f = MN_f = kS_fN_f \quad (4)$$

$$F_r = MN_r = kS_rN_r \quad (5)$$

$$S_f = \frac{R_f W_f - V_f}{V_f} \quad (6)$$

$$S_r = \frac{R_r W_r - V_r}{V_r} \quad (7)$$

Wherein M=F/N (F; drive power, N; vehicle load to the ground)

k=M/S (S; slip rate).

Where gear ratios of front and rear sides are $G_f$, $G_r$, angular velocities of propeller shafts for the rear and front wheels are $n_f$ and $n_r$, relation between the torque and the angular velocity can be shown by following formulas:

$$T_f = \frac{R_f}{G_f} \quad (8)$$

$$T_r = \frac{R_r F_r}{G_r} \quad (9)$$

$$n_f = G_f \omega_f \quad (10)$$

$$n_r = G_r \omega_r \quad (11)$$

From the formulas (4), (6), (8), (10), $$T_f = kN_f\left(\frac{R_f}{G_f}\right) \frac{\left(\frac{R_f}{G_f}\right)n_f - V_f}{V_f} \quad (12)$$

From the formulas (5), (7), (9), (11), $$T_r = kN_f\left(\frac{R_r}{G_r}\right) \frac{\left(\frac{R_r}{G_r}\right)n_r - V_r}{V_r} \quad (13)$$

From the formula (12), $$\left[T_f + kN_f\left(\frac{R_f}{G_f}\right)\right] V_f = kN_f\left(\frac{R_f}{G_f}\right)^2 n_f \quad (14)$$

From formula (13), $$\left[T_r + kN_r\left(\frac{R_r}{G_r}\right)\right] V_r = kN_r\left(\frac{R_r}{G_r}\right)^2 n_r \quad (15)$$

Speed ratiot of the vehicle between front side and rear side is found as follows;

$$t = \frac{V_f}{V_r} \quad (16)$$

From the formulas (14), (15), (16), $$t = \frac{T_r + kN_f\left(\frac{R_f}{G_f}\right)}{T_r + kN_r\left(\frac{R_r}{G_r}\right)} = \frac{N_f\left(\frac{R_f}{G_f}\right)^2 n_f}{N_r\left(\frac{R_r}{G_r}\right)^2 n_r} \quad (17)$$

A relationship between the torque for the rear wheels and the rotation speeds is found from formula (3) and (17) as follows;

$$tN_r\left(\frac{R_r}{G_r}\right)^2 n_r\left[\frac{1-u}{u} T_r + kN_f\left(\frac{R_f}{G_f}\right)\right] = \quad (18)$$

$$N_f\left(\frac{R_f}{G_f}\right)^2 n_f\left[T_r + kN_r\left(\frac{R_r}{G_r}\right)\right]$$

$$\left[t\frac{1-u}{u} N_r\left(\frac{R_r}{G_r}\right)^2 n_r - N_f\left(\frac{R_f}{G_f}\right)^2 n_f\right] T_r =$$

$$kN_fN_r\left(\frac{R_f R_r}{G_f G_r}\right)\left[\left(\frac{R_f}{G_f}\right)n_f - t\left(\frac{R_r}{G_r}\right)n_r\right]$$

$$\therefore T_r = kN_fN_r\left(\frac{R_r R_r}{G_r G_r}\right)\left[\left(\frac{R_f}{G_f}\right)n_f - t\left(\frac{R_r}{G_r}\right)n_r\right] \Big/$$

$$\left[t\frac{1-u}{u} N_r\left(\frac{R_f}{G_f}\right)^2 n_r - N_f\left(\frac{R_f}{G_f}\right)^2 n_f\right]$$

A relationship between the torque for the rear wheels and the rotation speed difference between the front and rear wheels is found as follows;

$$DN = n_f - n_r \quad (19)$$

$$\therefore n_r = n_f - DN \quad (20)$$

From the formulas (19), (20), $$T_r = kN_rN_r\left(\frac{R_r R_r}{G_r G_r}\right) \frac{\left[\left(\frac{R_r}{G_r}\right) - t\left(\frac{R_r}{G_r}\right)\right]n_r + t\left(\frac{R_r}{G_r}\right)DN}{\left[\frac{1-u}{u} tN_r\left(\frac{R_r}{G_r}\right)^2 - N_r\left(\frac{R_r}{G_r}\right)^2\right]n_r - \frac{1-u}{u} tN_r\left(\frac{R_r}{G_r}\right)^2 DN} \quad (21)$$

-continued $$\therefore T_r = kN_r\left(\frac{R_r}{G_r}\right)u\frac{\left[\left(\frac{R_r G_r}{R_r G_r}\right) - t\right]n_r + tDN}{\left[t(1-u) - \left(\frac{N_r}{N_r}\right)\left(\frac{R_r G_r}{R_r G_r}\right)^2 u\right]n_r - t(1-u)DN}$$

The rotation speed difference between the front and rear wheels DN, the angular velocity of the front propeller shaft $n_f$ and the vehicle ratio t are measured to be applied to the formula (21) so that the torque $T_r$ for the rear wheels can be obtained. The torque $T_r$ is controlled to the value as obtained so that a desirable torque distribution ratio for the rear wheels which is predetermined in accordance with vehicle operating conditions such as vehicle speed, steering rate and the like, can be maintained at a constant value. There is shown a relation between the rear torque $T_r$ and the rotation speed difference DN obtained by means of the formula (21).

Where a distance between the front wheels is $b_1$, a distance between the rear wheels is $b_2$, a distance between the front and rear wheels is l, steered angle of the inside and outside front wheels are $A_1$, $A_2$ respectively, distances between a rotation center of the vehicle and inside and outside of the front wheels, and inside and outside of the rear wheels are $R_1, R_2, R_3$, and $R_4$ respectively, the speed ratio t of the vehicle can be shown as follows.

$$R_1 = \frac{l}{\sin A_1}, R_2 = \frac{l}{\sin A_2}$$

$$R_3 = \frac{l}{\tan A_1} + \frac{b_1 - b_2}{2}, R_4 = \frac{l}{\tan A_2} - \frac{b_1 - b_2}{2}$$

$$t = \frac{V_f}{V_r} = \frac{R_1 + R_2}{R_3 + R_4} = \frac{\frac{1}{\sin A_1} + \frac{1}{\sin A_2}}{\frac{1}{\tan A_1} + \frac{1}{\tan A_2}} \quad (22)$$

$$= \frac{\sin A_1 + \sin A_2}{\sin(A_1 + A_2)}$$

Therefore a value of the speed ratio t of the vehicle can be found by obtaining the steering ratio.

According to the present invention, the rotation speed difference between the front and rear wheels, the vehicle speed and the speed ratio of the vehicle are detected for controlling the amount of torque transmitted through the torque transmitting means so that the torque distribution ratio can be maintained at a given constant value irrespective of the change in the engine output torque. As a result an proper torque distribution control can be accomplished without introducing an expensive torque sensor into the torque control system.

Preferably, where the vehicle is operated in a high speed condition over a given vehicle speed and the steering angle is rather small, the amount of the transmitted torque through the power transmitting means is maximized. As the result a stable drivability of the vehicle in a straight path can be obtained under a high speed drive condition. Besides, a slip in the power transmitting means is minimized so that a friction loss therein can be reduced to thereby improve a durability of the vehicle.

The above and other objects and features of the present invention will become apparent from the following description of preferred embodiments taking reference to the accompanying drawings.

DESCRIPTION OF THE PREFERRED EMBODIMENTS

Figure 1:
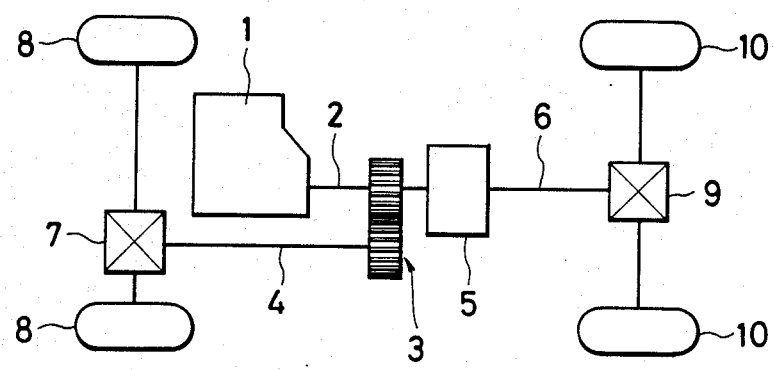
FIG. 1 is a diagrammatical illustration of a four-wheel drive vehicle in accordance with one embodiment of the present invention.

Referring to the drawings, particularly to the FIG. 1, there is shown a torque transmitting system for a four-wheel drive vehicle provided with a power plant 1 including an engine a transmission. an output shaft 2 of the power plant 1 is connected with a front propeller shaft 4 through a gear train 3 and with rear propeller shaft 6 through a power transmitting device or a hydraulic variable clutch mechanism 5. The front propeller shaft 4 is connected with front wheels 8 through a final gear unit 7 and the rear propeller shaft 6 is connected to rear wheels 10 through a final gear unit 9. A hydraulic pressure applied to the clutch mechanism 5 is controlled to so as to change the amount of the drive torque transmitted through the clutch mechanism 5 so that a torque distribution ratio can be controlled.

Figure 2:
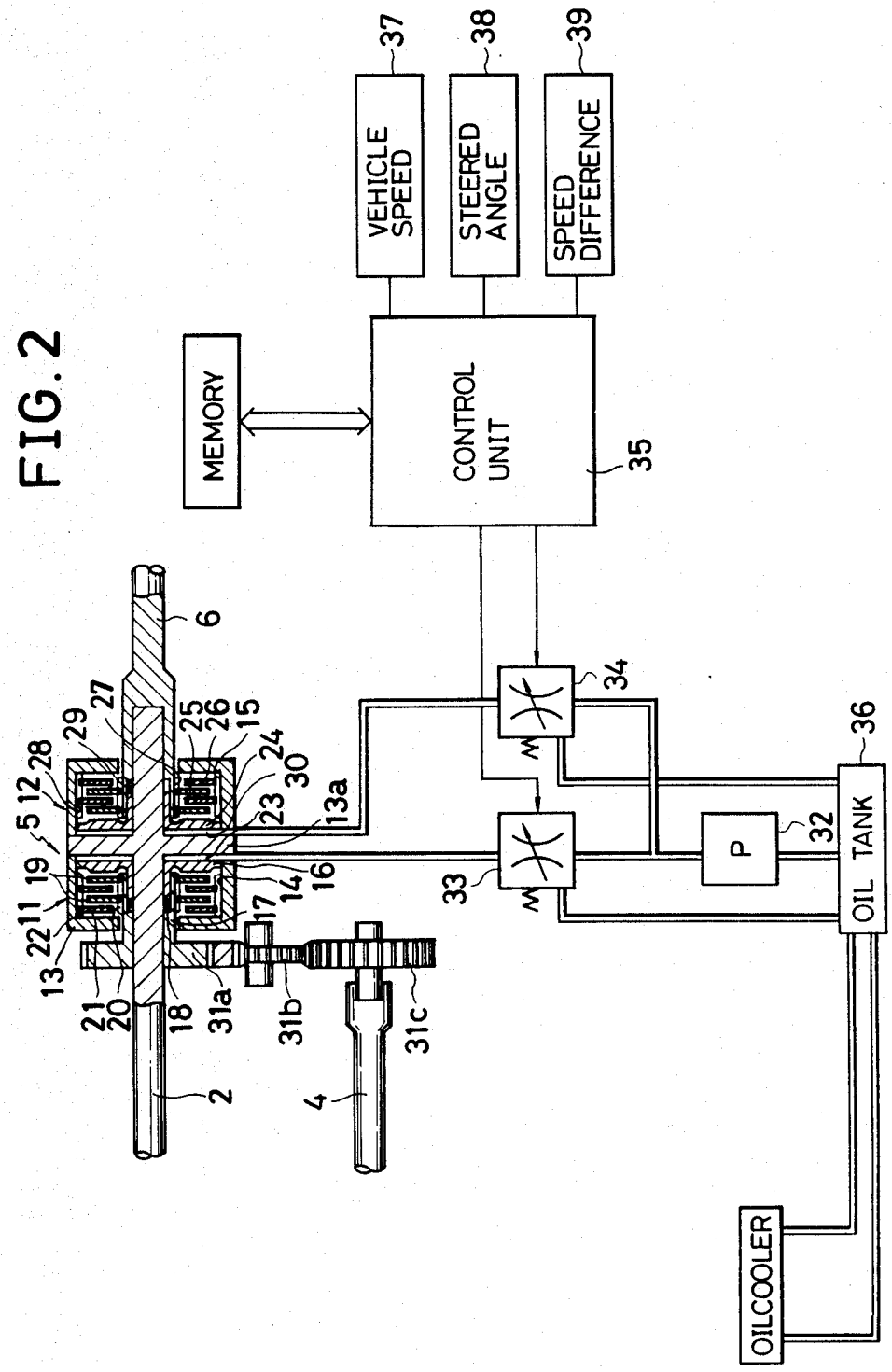
FIG. 2 is a diagrammatical illustration of a torque control system in accordance with one embodiment of the present invention.
Figure 3:
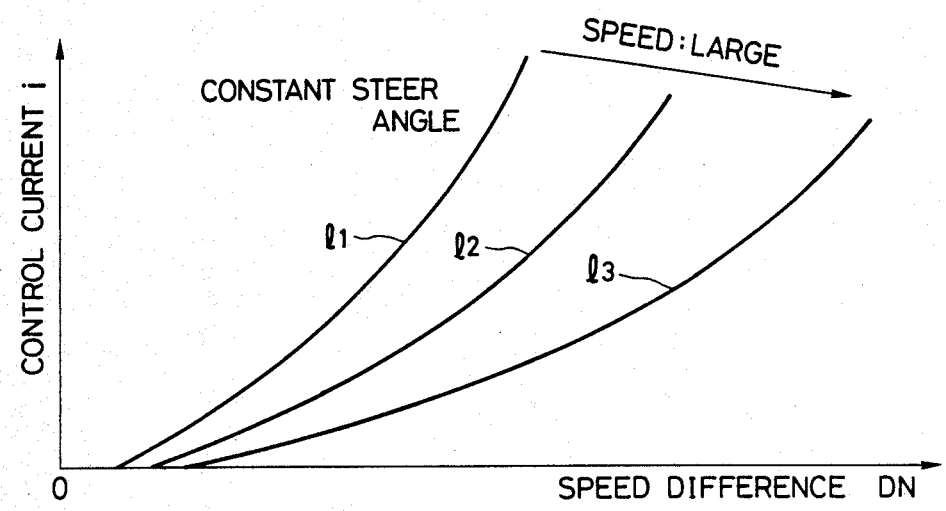
FIG. 3 is a graphical representation showing a relationship between a control current and a speed difference between the front and rear wheels at a constant steered angle.
Figure 4:
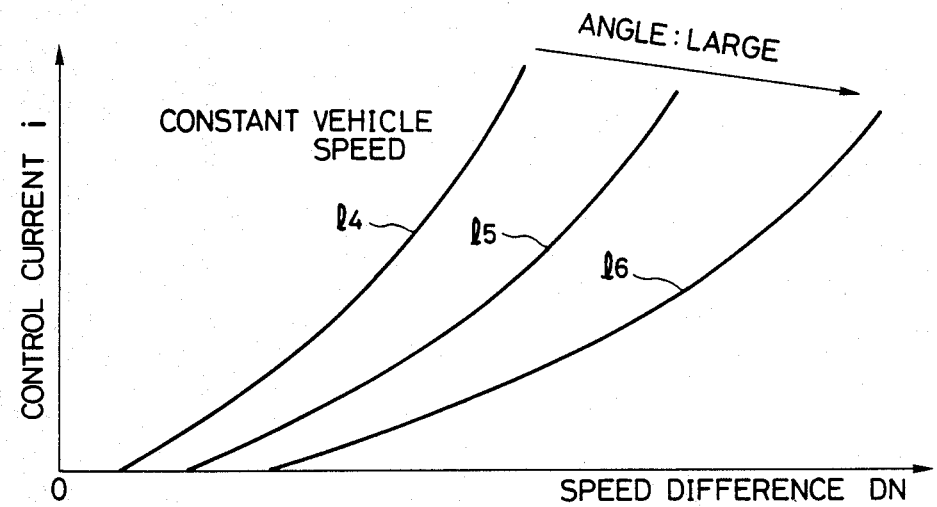
FIG. 4 is a graphical representation showing a relationship between a control current and a speed difference between the front and rear wheels at a constant vehicle speed when the control line $l_1$ is selected in FIG. 3.

As shown in the FIG. 2, the clutch mechanism 5 includes a hydraulic clutch 11 for front wheels 8, and a hydraulic clutch 12 for the rear wheels 10. The clutches 11 and 12 are disposed in a casing 13 which is divide a wall portion 13a to define oil cylinders 14 and 15. The casing 13 is integrally formed with a output shaft 2 extending through the cylinders 14 and 15. The clutch 11 is provided with a piston 16 slidably mounted on the output shaft 2 in the cylinder 14. An output shaft 17 is also mounted on the output shaft 2 of the power plant 1 and engaged with the piston 16 at the rear and portion thereof. A spring 18 is disposed between the output shaft 2 and the piston 16 to urge the piston 16 against the wall portion 13a in the axial direction of the output shaft 2. The clutch 11 further includes a plurality of clutch plates 19 in meshing engagement with splines 20 formed on the rear end portion of the output shaft 2 of the power plant 1 and a plurality of clutch plates 21 in meshing engagement with splines 22 formed on the inside of the cylinder 14. The clutch plates 19 and 21 are alternately and slidably disposed in the cylinder 14 so that the clutch plates 19 and 21 move along the splines 20 and 22. The clutch plates 19 and 21 are brought into contact with each other to thereby transmit the drive torque to the output shaft 17 from output shaft 2 of the power plant 1 when the hydraulic pressure is introduced into a chamber 23 defined between the piston 16 and the wall portion 13a. The clutch 12 for the rear wheels 10 as well as the clutch 11 is provided with a piston 24 mounted on the shaft 17, a plurality of clutch plates 25 and 26 in meshing engagement with splines 27 on the front end portion of the output shaft 2 of the power plant 1 and splines 28 on the inside of the casing 13, and a spring 29. The clutch plates 25 and 26 move along the splines 27 and 28 to be brought into contact with each other when the hydraulic pressure is introduced into a chamber 30 defined between the wall portion 13a so that the drive torque from the output shaft 2 is transmitted to the rear propeller shaft 6 for the rear wheels 8. It will be understood that the amount of the drive torque transmitted by the clutches 11 and 12 corresponds to the hydraulic pressure introduced into the chamber 23 and 30.

The output shaft 17 of the hydraulic clutch 11 is formed with gear 31a at the end portion thereof. The gear 31a is engaged with a gear 31c provided at the end portion of the front propeller shaft 4 through an idler gear 31b so that the clutch 11 can transmit the drive torque to the propeller shaft 4 from the output shaft of the power plant 1 when the hydraulic pressure is introduced into the chamber 23. On the other hand, the hydraulic clutch 12 is connected with the front end portion of the rear propeller shaft 6. The clutches 11 and 12 are communicated with a hydraulic pump 32 through flow control valves 33 and 34.

The flow control valves 33 and 34 are controlled by signals from a control unit 35.

In the FIG. 2, control oil stored in an oil tank 36 is pumped up by the pump 32 to produce a predetermined pressure and introduced into an oil chamber 23,30 in the clutch mechanism 5 through a control valves 33,34. The control valve 33,34 are adapted to be controlled by a control unit 35 to regulate the hydraulic pressure so that an engaging force of the clutch mechanism 5 in other words, drive torque transmitted through the clutch mechanism 5 can be controlled.

To the control unit 35 connected are a vehicle speed sensor 37 for detecting vehicle speed to produce a signal $S_V$, a steering angle sensor 38 for detecting a steered angle to produce a signal SA, a speed difference sensor 39 for detecting a speed difference DN between the front propeller shaft 4 and rear propeller shaft 6 to produce a signal $SD_n$. A rotation speed sensor for detecting a rotation speed of the front propeller shaft 4 may be employed as a vehicle speed sensor 37. A rotation speed sensor for detecting a rotation speed of the rear propeller shaft 6 may be connected to the control unit 35 adapted to calculate the speed difference so that the rotation speed difference DN can be obtained without employing the above speed difference sensor 39.

The control unit 35 receives the signals $S_V$, SA, and $SD_n$ to provide the control valves 33,34 with a control current i in accordance with control maps $M_1$, $M_2$, $M_3$, and $M_4$ as shown FIG. 3 and FIG. 4, FIG. 5 and FIG. 6 respectively. The control map $M_1$ including control lines $l_1, l_2,$ and $l_3$ is provided for a drive condition under a constant steered angle and various vehicle speeds. In the map $M_1$, the rotation speed difference DN increases in accordance with an increase of the vehicle speed. The control lines $l_4, l_5,$ and $l_6$ in the map $M_2$, $l_{14}, l_{15},$ and $l_{16}$ in the map $M_3$, $l_{24}, l_{25},$ and $l_{26}$ in the map $M_4$ and are provided in correspondence with the control line $l_1, l_2,$ and $l_3$ of the map $M_1$ respectively under various steered angles. It will therefore be understood that similar maps as the map $M_2$, $M_3$ and $M_4$ may be prepared in correspondence with various control lines in the map $M_1$. In the map $M_2, M_3,$ and $M_4$, The speed difference DN is increases in accordance with an increase of the steered angle.

In operation, the control unit 35 receives the signals $S_V$, SA, and $SD_n$ from the sensor 37,38, and 39 to judge whether the vehicle is under a constant steered angle or under a varying steered angle condition. When the vehicle is under a constant steered angle, the control unit 35 selects the control map $M_1$. On the other hand when under a steering drive condition, the control map $M_2$ or another is selected in accordance with the vehicle speed. When the first control map $M_1$ is selected, the control unit 14 selects a proper control line among the lines $l_1, l_2,$ and $l_3$ in accordance with the signal $SD_n$ to determine the control current i. the determined current i is applied to the control valves 33,34 so that the control valves 33, 34 produce a hydraulic pressure P in proportion to the value of the control current i to be applied to the clutch mechanism 5. The clutch mechanism 5 is actuated by the pressure to produce an engaging force to transmit the torque $T_r$ proportional to the hydraulic pressure P to the rear propeller shaft 6.

On the other hand, under a varying steered angle condition, the control unit 35 selects a proper control line among control lines in the map $M_2$ or the like in accordance with the steering angle signal SA, and vehicle speed signal $S_v$ to determine a value of the control current i base on the speed difference $SD_n$. Thus, the torque distribution ratio for rear wheels u can be maintained at a constant value in accordance with the speed difference DN. It should be noted that the torque distribution ratio u may be fixed at a predetermined value in accordance with a particular of the vehicle and may change in accordance with vehicle operating conditions. The control current can be obtained by a calculation in the control unit 35 without using the maps as described above.

Further the control current may be maximized under a high speed drive condition more than a predetermined vehicle speed at a small steered angle so that the front wheels are directly connected with the rear wheels.

Figure 7:
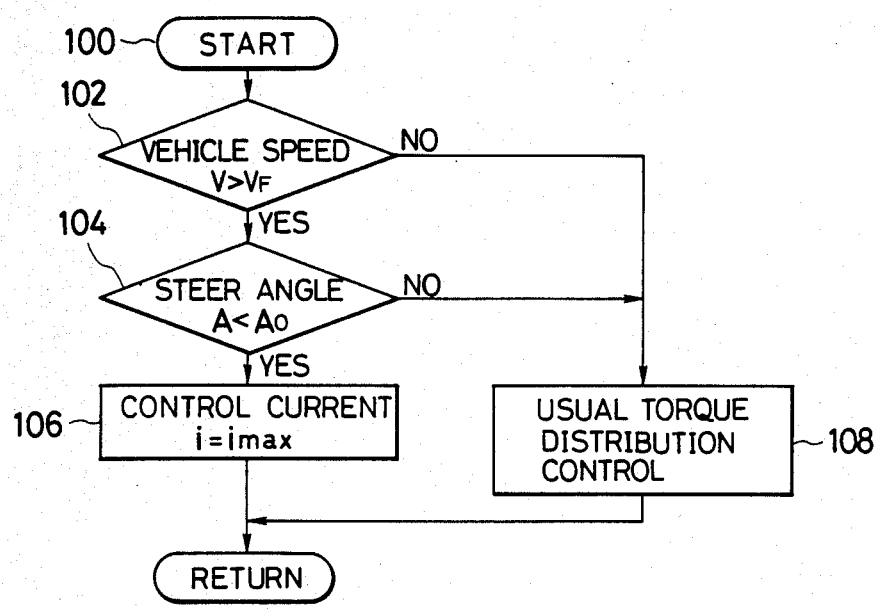
FIG. 7 is a flow chart of a torque distribution control in accordance with the present invention.
Figure 9:
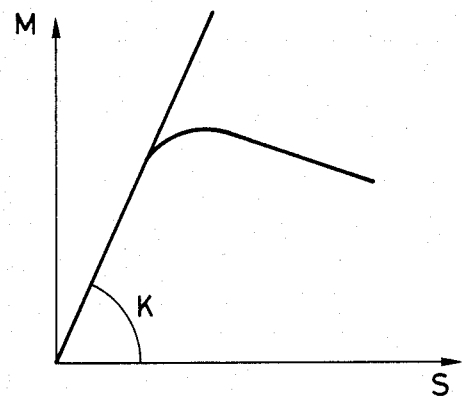
FIG. 9 is a graphical representation of a relationship between a coefficient M and slip rate S.

Reffering to FIG. 7, there is shown in a torque distribution control in accordance with the present invention. In FIG. 7, the control unit 35 judges whether or not vehicle speed V is larger than a predetermined vehicle speed $V_F$ (step 102). When the vehicle speed V is larger than the vehicle speed $V_F$, the control unit in turn judges whether or not a steered angle A is smaller than a predetermined steering angle $A_0$ (step 104). When the judgement is yes, the control unit provides the control current i with the maximum value $i_{max}$ (step 106) so as to maximize the torque distribution for the rear wheels. As the result, a friction loss in the clutch mechanism 5 is reduced to thereby improve the durability of the vehicle. And a stable drivability can be obtained in a straight path. When the vehicle speed V is not larger than the vehicle speed $V_F$ or the steered angle A is not smaller than the steering angle $A_0$, an usual torque distribution control is carried out.

The clutch mechanism 5 may be disposed between the front propeller shaft 4 and the power plant 1.

Figure 8:
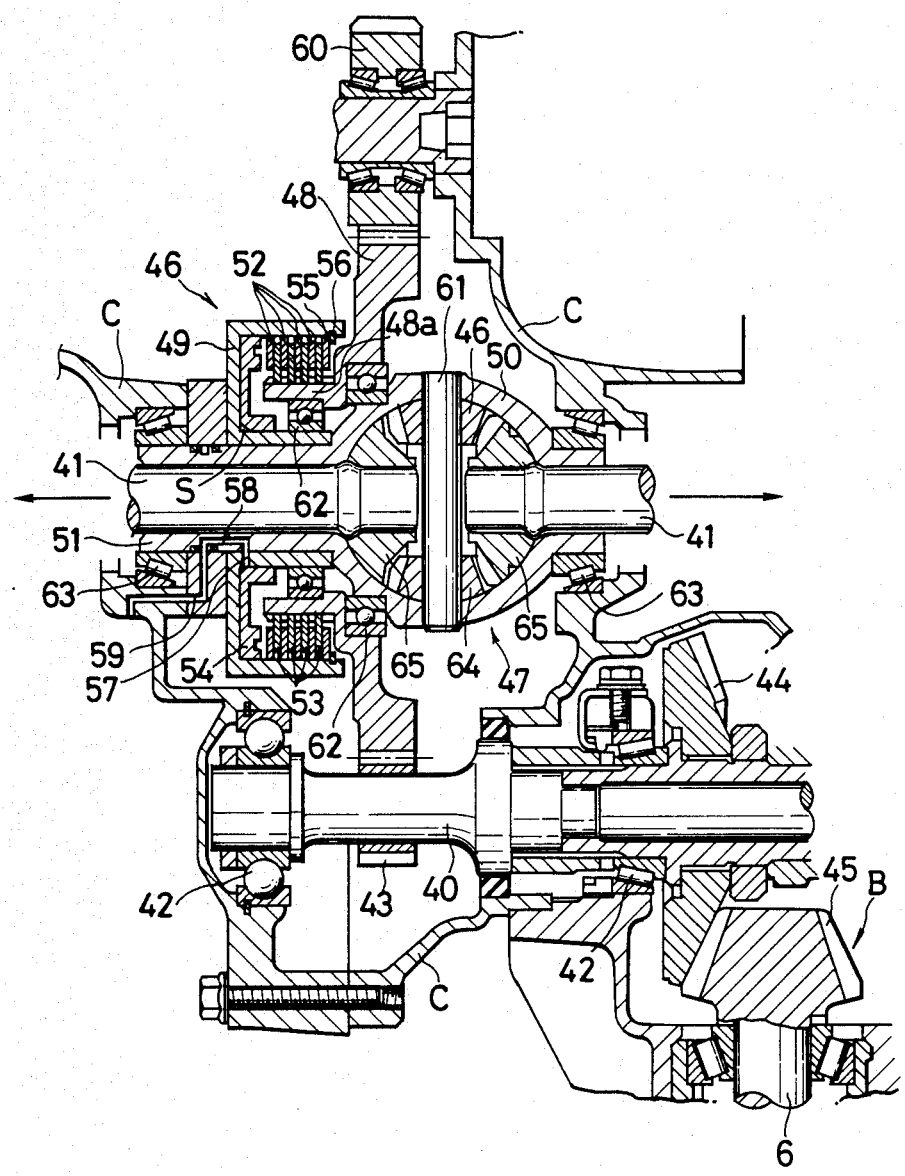
FIG. 8 is a partially sectional view of another embodiment of the torque control system in accordance with the present invention.

Another embodiment of the torque control system in accordance with the present invention is shown in FIG. 8. In this embodiment, a drive gear of the output shaft 2 of the power plant 1 is connected with an ring gear 48 through an intermediate gear 60. These gears 48, and 60, are of a spur gear so that the axis of the ring gear is 48 in parallel with the output shaft of the engine.a front differential gear mechanism 47 is extended through the central portion of the ring gear 48. The ring gear 48 is rotatably carried by a differential gear case 50 through a bearing device 62. The front differential gear mechanism 47 is provided with the differential gear case 50 rotatably carried through a bearing device 63, a pair of pinions 64 disposed in the differential gear case 50, and a pair of side gears 65 in meshing engagement with the pinions 64. The side gears 65 are adapted to rotate integrally with the differential gear case 50 through a shaft 61 which carries the side gears 65. The side gears 65 are connected with front drive shafts 40 respectively. there is disposed an input shaft 40 of a rear wheel drive mechanism B in the vicinity of front drive shafts 41 for the front wheels 8 and in parallel with the shaft 41. The input shaft 40 is rotatably mounted on a casing C through bearings 42. The input shaft 40 is provided with a input gear 43 in meshing engagement with a ring gear 48 and a bevel gear 44 in meshing engagement with a pinion 45 which is integrated with a rear propeller shaft 6. The rear propeller shaft 6 is connected with the rear wheels 10 through a rear differential gear mechanism (not shown). A wet clutch 46 which can change a torque transmitted therethrough is disposed between a front differential gear mechanism 47 and the ring gear 48. The clutch 46 is provided with a clutch drum 49 which is integrally formed with the differential gear case 50. The drum 49 is engaged with a tubular portion 51 which covers one of the drive shaft 41. There is formed a tubular holding portion 48a at the inner edge portion of the ring gear 48. The clutch drum 49 rotatably holds a plurality of driven plates 52. On the other hand, the holding portion 48a of the ring gear 48 holds a plurality of drive plates 53. A piston 54 is slidably disposed in the clutch drum 49 to define an oil chamber S so that the piston 54 moves to bring the plates 52 into pressure engagement with the plates 53 when the hydraulic pressure is introduced into the chamber S. The driving force provided by the piston 54 finally acts on the clutch drum 49 through the plates 52, and 53, an end plate 55 and a snap ring 56. Thus the clutch drum 49 or the front differential gear mechanism 47 is connected with the ring gear 48 by means of a frictional force corresponding to the hydraulic pressure.

The hydraulic pressure is introduced into the oil chamber S through an inlet 57 formed in the clutch drum 49, an oil passage 58 in the differential gear case 50, and an oil passage 59 in the casing C. When the hydraulic pressure in the chamber S is released, the clutch 46 is disengaged.

In operation, drive torque from the power unit 1 is transmitted to the ring gear 48 through an intermediate gear 60. In turn, the drive torque is transmitted to the rear wheel drive mechanism B through the input gear 43. At the same time, the drive torque is transmitted from the ring gear 48 to the front differential gear mechanism 47 through the clutch 46. Thus, when the clutch 46 is disengaged, the two-wheel driving condition is obtained. On the other hand, when the clutch 46 is engaged, the four-wheel driving condition is obtained. It will noted that the frictional force in the clutch 46 is controlled in accordance with the hydraulic pressure so that the torque distribution ratio between the front wheels 8 and rear wheels 10 can be broadly controlled from 0:100 to 50:50. In this case, the amount of the torque to the rear wheels can be provided more than that of the front wheels 10 so that an stable drivability can be obtained.

Figure 5:
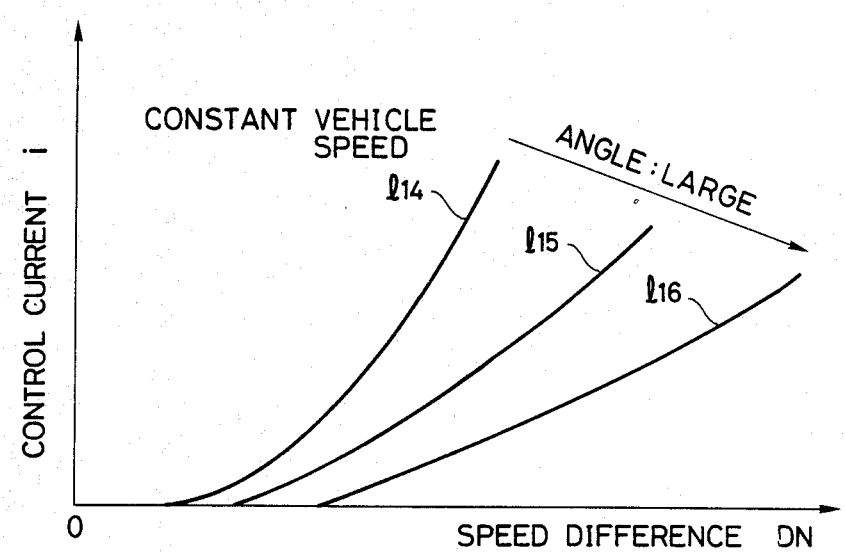
FIG. 5 is a graphical representation showing a relationship between a control current and a speed difference between the front and rear wheels at a constant vehicle speed when the control line $l_2$ is selected in FIG. 3.
Figure 6:
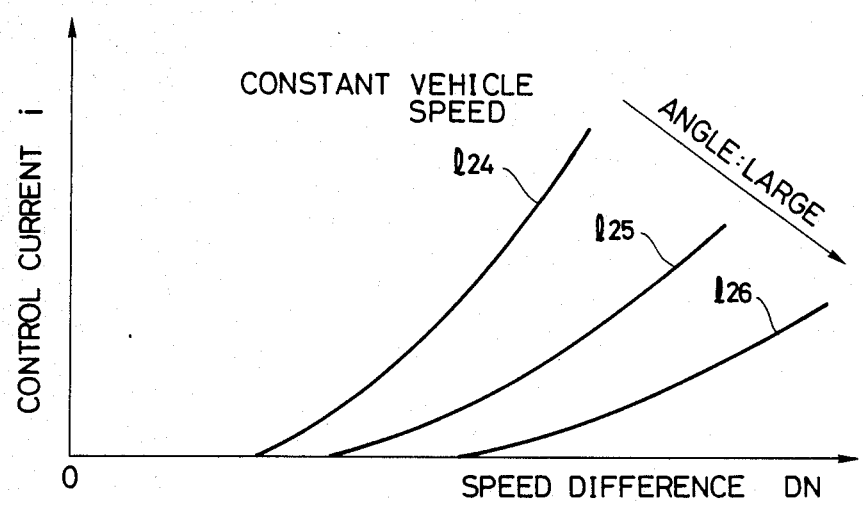
FIG. 6 is a diagram showing a relationship between a control current and a speed difference between the front and rear wheels at a constant vehicle speed when the control line $l_3$ is selected in FIG. 3.

The structure of the torque control system as aforementioned in connection with the FIG. 5 can also accomplish the improved torque control in accordance with the present invention.

We claim:

1. A torque control system for vehicles provided with four-wheel drive system including a power plant producing a drive torque for driving wheels, torque transmitting mechanisms for transmitting the drive torque from the power plant to front and rear wheels respectively, and power transiting means provided in at least one of said power transmitting mechanisms for changing the amount of the drive torque transmitted therethrough so that the torque distribution ratio between the front and rear wheels can be controlled, CHARACTERIZED IN THAT the torque control system further comprises actuator means for operating said power transmitting means to control said torque distribution ratio vehicle speed detecting means for detecting a vehicle speed, steering angle detecting means for detecting a steered angle of the steering wheel, speed difference detecting means for detecting a rotation speed difference between the front and rear wheels, torque control means for determining a control factor for operating said actuator means in accordance with the speed difference under a given vehicle speed and a given steering angle so that the torque distribution ratio between the front and rear wheels is maintained at a desirable constant value.

2. A torque control system in accordance with claim 1 wherein said power transmitting means is a hydraulic clutch including a drive and driven plates, said actuator means including a piston actuated by a hydraulic pressure to drive the plates and bring them into contact with each other, the control factor being said hydraulic pressure controlled by said torque control means.

3. A torque control system in accordance with claim 2 wherein said torque control means includes a hydraulic pressure control valve provided in an oil passage to the hydraulic clutch, said control valve being adapted to produce a hydraulic pressure in proportion to a control current which is produced in said torque control means so as to be applied to the hydraulic pressure control valve.

4. A torque control system in accordance with claim 3 wherein said torque control means is provided with control maps in which predetermined control currents are memorized in accordance with input signals, the torque control means being adapted to produce the control current based on the maps.

5. A torque control system in accordance with claim 1 wherein said power transmitting means are provided in a torque transmitting path for transmitting the drive torque from the power plant to the front wheels.

6. A torque control system in accordance with claim 1 wherein said power transmitting means is provided in a torque transmitting path for transmitting the drive torque from the power plant to the front wheels.

7. A torque control system in accordance with claim 6 wherein said power transmitting means is a hydraulic clutch including a piston actuated by a hydraulic pressure, and drive and driven plates driven by said piston to be brought into contact with each other, said hydraulic pressure being controlled by said torque control means, and wherein a hydraulic pressure control valve is provided in an oil passage to the hydraulic clutch, said control valve being adapted to produce the hydraulic pressure in proportion to a control current which is produced by said torque control means so as to be applied to the hydraulic pressure control valve.

8. A torque control system in accordance with claim 1 wherein said torque control means includes a memory in which the amount of a predetermined torque to be transmitted is memorized in accordance with rotation speed difference between the front and rear wheels which correspond to vehicle speed and steered angle of the steering wheel, said torque control means being adapted to control the power transmitting means based on said memorized value of the torque.

9. A torque control system in accordance with claim 1 wherein said torque control means includes override means for maximizing the amount of the torque transmitted through the power transmitting means under a high speed drive condition wherein the vehicle speed is greater than a predetermined value at a small steered angle of steering wheel to override the control for maintaining the torque distribution ratio at the desirable constant value.

10. A torque control system for vehicles provided with four-wheel drive system including a power plant producing a drive torque for driving wheels, torque transmitting mechanisms for transmitting the drive torque from the power plant to front and rear wheels respectively, and power transiting means provided in at least one of said power transmitting mechanisms for changing the amount of the drive torque transmitted therethrough so that the torque distribution ratio between the front and rear wheels can be controlled, CHARACTERIZED IN THAT the torque control system further comprises actuator means for operating said power transmitting means to control said torque distribution ratio vehicle speed detecting means for detecting a vehicle speed, steering angle detecting means for detecting a steered angle of the steering wheel, speed difference detecting means for detecting a rotation speed difference between the front and rear wheels, torque control means for determining a control factor for operating said actuator means in accordance with the speed difference under a given vehicle speed and a given steering angle so that the torque distribution ratio between the front and rear wheels is maintained at a desirable constant value wherein said power transmitting means are provided in a torque transmitting path for transmitting the drive torque from the power plant to the front wheels, and the system including a transmission disposed in the vicinity of an engine located transversely at front portion of an vehicle body, the transmission being provided with an input and output shaft extending in the axial direction of the output shaft of the engine, a ring gear in meshing engagement with an output gear of the transmission, a front differential gear mechanism relatively rotatable with the ring gear extending through the central portion of the ring gear, a hydraulic clutch disposed on the same axis as the ring gear so as to control engagement and disengagement between the ring gear and the front differential mechanism and changing the amount of the drive torque transmitted through the clutch device in accordance with a hydraulic pressure, and a rear wheel drive mechanism in meshing engagement with the ring gear for transmitting the drive torque from the engine to the rear wheels.

11. A torque control system in accordance with claim 10 wherein a hydraulic pressure control valve is provided in an oil passage to the hydraulic clutch, said control valve being adapted to produce a hydraulic pressure in proportion to a control current which is produced by said torque control means so as to be applied to the hydraulic pressure control valve.

12. A torque control system for vehicles provided with a four-wheel drive system including a power plant producing a drive torque for driving wheels, torque transmitting mechanisms for transmitting the drive torque from the power plant to front and rear wheels respectively, power transmitting means provided in at least one of said power transmitting mechanisms for changing the amount of the drive torque transmitted therethrough so that the torque distribution ratio between the front and rear wheels can be controlled, the torque control system further including torque control means for controlling torque distribution as between the front and rear wheels dependent on driving conditions so as to maintain a required torque distribution ratio related to a particular driving condition including vehicle speed detecting means for detecting vehicle speed, steering angle detector means for detecting a steered angle of a vehicle steering wheel, speed difference detecting means for detecting a rotation speed difference between the front and rear wheels, and discrimination means for receiving signals from the respective detecting means using said signals to determine a driving condition and operating the power transmitting means accordingly.

13. A torque control system as defined in claim 12 wherein the discrimination means includes memory means and means for comparing signals received from the respective detecting means with information stored in the memory means so as to determine the driving condition and operate the power transmitting means accordingly.

* * * * *